United States Patent
Wang

(10) Patent No.: US 9,564,069 B2
(45) Date of Patent: Feb. 7, 2017

(54) FLEXIBLE SURROGATE SPINE ASSEMBLY FOR CRASH TEST DUMMY

(75) Inventor: Zhenwen J. Wang, Northville, MI (US)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 933 days.

(21) Appl. No.: 13/427,381

(22) Filed: Mar. 22, 2012

(65) Prior Publication Data

US 2013/0252220 A1    Sep. 26, 2013

(51) Int. Cl.
*G09B 23/30*    (2006.01)
*G09B 23/32*    (2006.01)
*G09B 23/34*    (2006.01)

(52) U.S. Cl.
CPC .............. *G09B 23/32* (2013.01); *G09B 23/34* (2013.01)

(58) Field of Classification Search
None
See application file for complete search history.

(56) References Cited

U.S. PATENT DOCUMENTS

| | | | |
|---|---|---|---|
| 3,762,069 A * | 10/1973 | Culver | 434/274 |
| 4,488,433 A | 12/1984 | Denton et al. | |
| 4,948,373 A * | 8/1990 | Engels | 434/270 |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,741,989 A | 4/1998 | Viano et al. | |
| 6,422,874 B1 * | 7/2002 | Green et al. | 434/274 |
| 6,982,409 B2 | 1/2006 | Huang et al. | |
| 7,086,273 B2 | 8/2006 | Lipmyer | |
| RE42,418 E | 6/2011 | Lipmyer | |
| 2009/0025492 A1 * | 1/2009 | Hwang et al. | 73/866.4 |

* cited by examiner

*Primary Examiner* — Robert R Raevis
(74) *Attorney, Agent, or Firm* — Howard & Howard Attorneys PLLC

(57) ABSTRACT

A flexible surrogate spine assembly for a crash test dummy includes a plurality of vertebra discs, a plurality of ligament joints disposed between the vertebra discs, the ligament joints having a joint element with varying joint angles that can replicate Kyphosis and Lordosis angles of a human spine.

16 Claims, 6 Drawing Sheets

FLEXIBLE SURROGATE SPINE ASSEMBLY FOR CRASH TEST DUMMY

BACKGROUND OF THE INVENTION

1. Field of the Invention

The present invention relates generally to Anthropomorphic Test Devices (ATD) and, more particularly, to a flexible surrogate spine assembly for an ATD having an adjustable curvature that can be used to assess and predict injuries under crash, under body explosive, and aerospace ejection seat testing environments.

2. Description of the Related Art

Automotive, aviation, military, and other vehicle manufacturers conduct a wide variety of collision, ejection and under-body-blast (UBB) testing to measure the effects of an impact upon a vehicle and its occupants. Through the testing, a vehicle manufacturer gains valuable information that can be used to improve the impact worthiness of the vehicle.

Impact testing often involves the use of anthropomorphic test devices, better known as "crash test dummies." During the testing, an operator places a crash test dummy inside a vehicle, and the vehicle undergoes a simulated collision, UBB, or ejection. The testing exposes the crash test dummy to high inertial loading, and sensors inside the crash test dummy, such as load cells, displacement sensors, accelerometers, pressure gauges, angle rate sensors, and the like, generate electrical signals of data corresponding to the loading. Cables or wires transmit these electrical signals of data to a data acquisition system (DAS) for subsequent processing. This data reveals information about the effects of the impact on the crash test dummy and can be correlated to the effects a similar impact would have on a human occupant.

In order to obtain more accurate test data, test engineers attempt to maximize what is known as the "biofidelity" of the crash test dummy. Biofidelity is a measure of how well the crash test dummy reacts like a human being in a vehicle impact test environment. A crash test dummy reacting as an actual human during a collision is said to have a high biofidelity. Accordingly, a crash test dummy having a high biofidelity will provide more accurate information from a collision test relative to the effect of the collision on a human being. Thus, ATD design engineers design crash test dummies with the proper anthropometry that reflects a total weight, center of gravity, mass moment of inertia and range of motion similar to that of a human body so as to increase the biofidelity of the crash test dummy.

However, it has been difficult to replicate the human spine for a crash test dummy. In particular, the human spine may have curvatures known as Kyphosis and Lordosis. Kyphosis is a curving of the spine that causes a bowing or rounding of the back, which leads to a hunchback or slouching posture. Lordosis is a curving of the spine that causes an abnormal forward or inward curvature of the spine in the lumbar region of a portion of the lumbar and cervical vertebral column. Two segments of the vertebral column, namely cervical and lumbar, are normally lordotic, that is, they are set in a curve that has its convexity anteriorly (the front) and concavity posteriorly (behind), in the context of human anatomy. As a result of the curvatures, Kyphosis and Lordosis angles may be measured. For example, a male may have a Kyphosis angle between 48-60° and a Lordosis angle is between 24-46°.

It is desirable to provide a surrogate spine for a crash test dummy that has improved biofidelity for the crash test dummy. It is also desirable to provide a surrogate spine for a crash test dummy that can replicate the Kyphosis and Lordosis angles. It is further desirable to provide a flexible surrogate spine for a crash test dummy. It is also desirable to provide a modular surrogate spine for a crash test dummy. It is still further desirable to provide a surrogate spine for a crash test dummy having spine and rib load cells. Therefore, there is a need in the art to provide a flexible, modular, surrogate spine for use in a crash test dummy so that biofidelity of the crash test dummy is improved.

SUMMARY OF THE INVENTION

Accordingly, the present invention is a flexible surrogate spine assembly for a crash test dummy. The flexible surrogate spine assembly includes a plurality of vertebra discs. The flexible surrogate spine assembly also includes a plurality of ligament joints disposed between the vertebra discs. The ligament joints have a joint element with varying joint angles that can replicate Kyphosis and Lordosis angles of a human spine.

In addition, the present invention is a crash test dummy including a body and a flexible surrogate spine assembly connected to the body. The flexible surrogate spine assembly includes flexible surrogate spine assembly comprising a plurality of vertebra segments with varying joint angles that can replicate Kyphosis and Lordosis angles of a human spine.

One advantage of the present invention is that a flexible surrogate spine assembly is provided for a crash test dummy. Another advantage of the present invention is that the flexible surrogate spine assembly for a crash test dummy has improved biofidelity for the crash test dummy. Yet another advantage of the present invention is that the flexible surrogate spine assembly for the crash test dummy represents a human spine with the ability to adjust the curvature for different postures. Still another advantage of the present invention is that the flexible surrogate spine assembly for the crash test dummy has the same number of vertebra discs as a human spine and the same number of ligament joints between the vertebra discs. A further advantage of the present invention is that the flexible surrogate spine assembly for a crash test dummy has modular vertebra segments that allow the spine curvature to be adjusted with different combinations of the modular vertebra segments. A still further advantage of the present invention is that the flexible surrogate spine assembly for a crash test dummy allows each vertebra disc to be replaced with transducers such as a spine load cell and rib load cell to measure the force and moment on the spine during a collision involving the crash test dummy.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
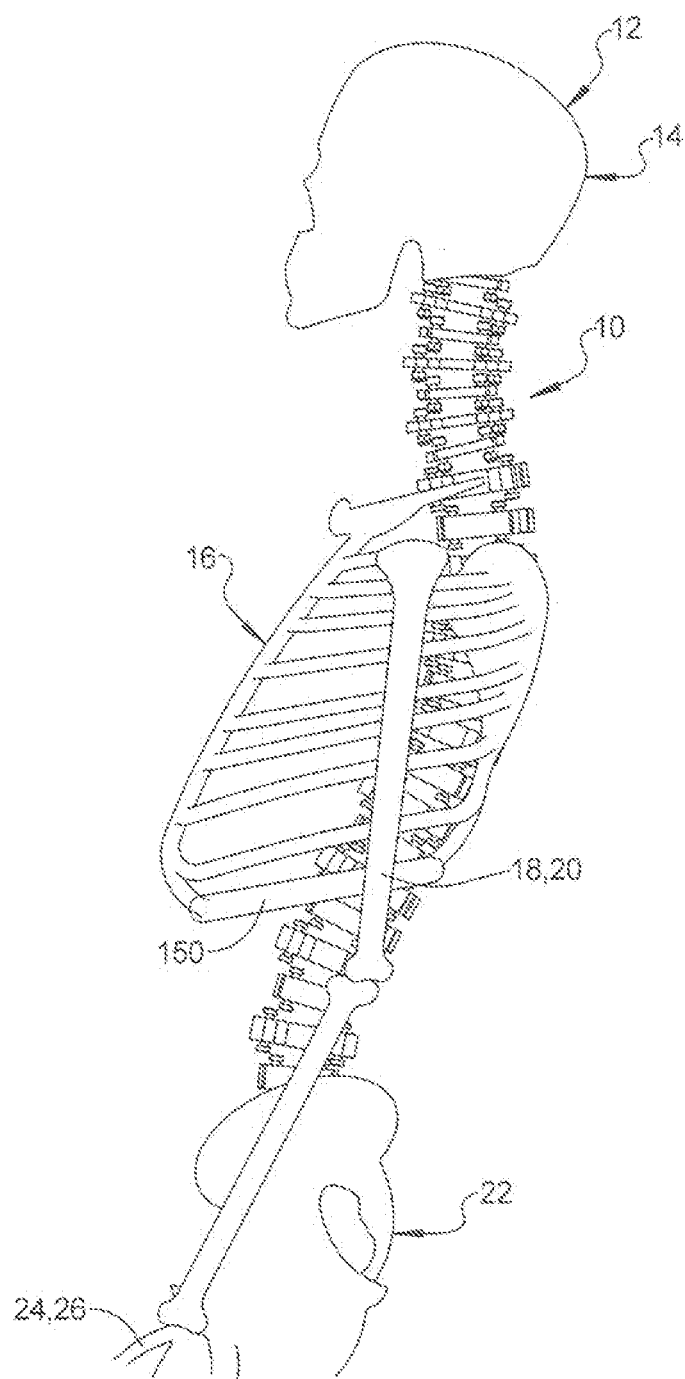
FIG. 1 is a perspective view of a flexible surrogate spine assembly, according to the present invention, illustrated in operational relationship with a crash test dummy.

Referring to the drawings and in particular FIG. 1, one embodiment of a flexible surrogate spine assembly 10, according to the present invention, is shown in operational relationship with a crash test dummy, generally indicated at 12. The crash test dummy 12 is of a fiftieth percentile (50%) male type and is illustrated in a standing position. This crash test dummy 12 is used primarily to test the performance of automotive interiors and restraint systems for adult front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 has a head assembly 14, which includes a one-piece plastic skull, an instrumentation core, and a vinyl skin. The instrumentation core is removable for access to head instrumentation contained inside the head assembly 14.

The crash test dummy 12 also includes the flexible surrogate spine assembly 10, according to the present invention, having an upper end mounted to the head assembly 12 by a nodding block (not shown) and a nodding joint (not shown). The spine assembly 10 has a lower end extending into a torso area of the crash test dummy 12 and is connected to a spine mounting weldment (not shown) by an adapter assembly (not shown).

The torso area of the crash test dummy 12 includes a rib cage assembly 16 connected to the spine assembly 10. The crash test dummy 12 also has a pair of arm assemblies including a right arm assembly 18 and a left arm assembly 20, which are attached to the crash test dummy 12. The left arm assembly 20 includes a clavicle link (not shown), which connects a clavicle (not shown) to the top of the spine assembly 10. It should be appreciated that the right arm assembly 18 is constructed in a similar manner.

As illustrated in the FIG. 1, a lower end of the lumbar spine is connected to a lumbar-thoracic adapter (not shown), which is connected to a lumbar to pelvic adapter (not shown). The crash test dummy 12 includes a pelvis assembly 22 connected to the adapter. The crash test dummy 12 includes a right leg assembly 24 and a left leg assembly 26, which are attached to the pelvis assembly 22. It should also be appreciated that various components of the crash test dummy 12 are covered in a urethane skin such as a flesh and skin assembly (not shown) for improved coupling with the skeleton of the crash test dummy 12. It should further be appreciated that a lifting ring (not shown) may be attached to the head assembly 14 for lifting the crash test dummy 12 into and out of test fixtures and vehicles.

Figure 4:
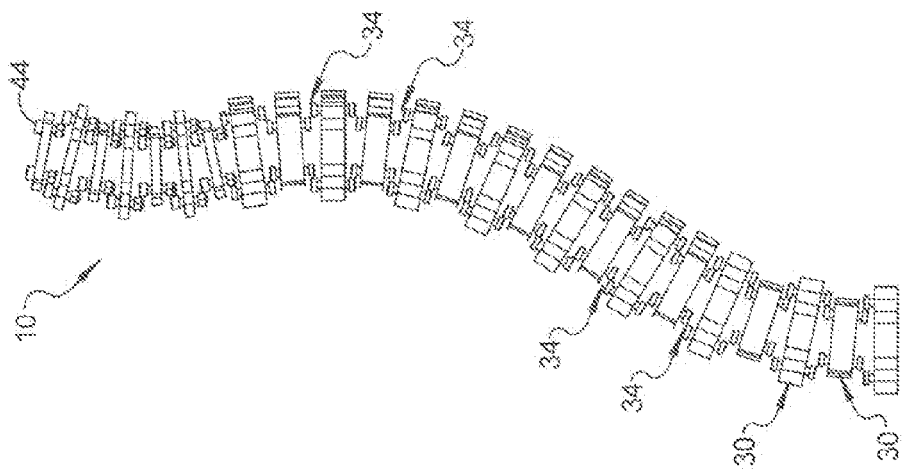
FIG. 4 is a side elevational view of the flexible surrogate spine assembly of FIG. 1.
Figure 3:
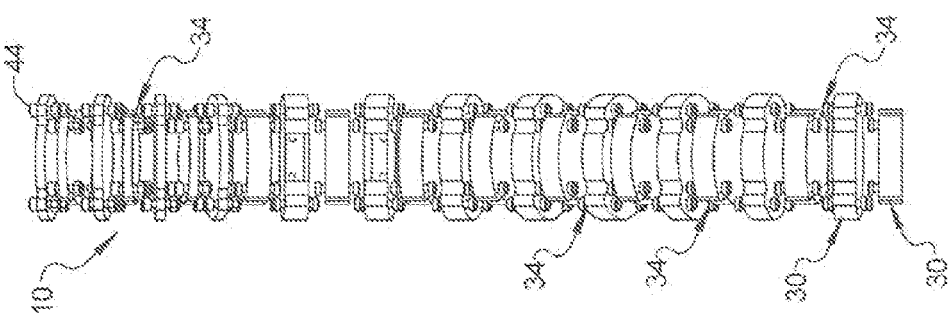
FIG. 3 is a front elevational view of the flexible surrogate spine assembly of FIG. 1.
Figure 2:
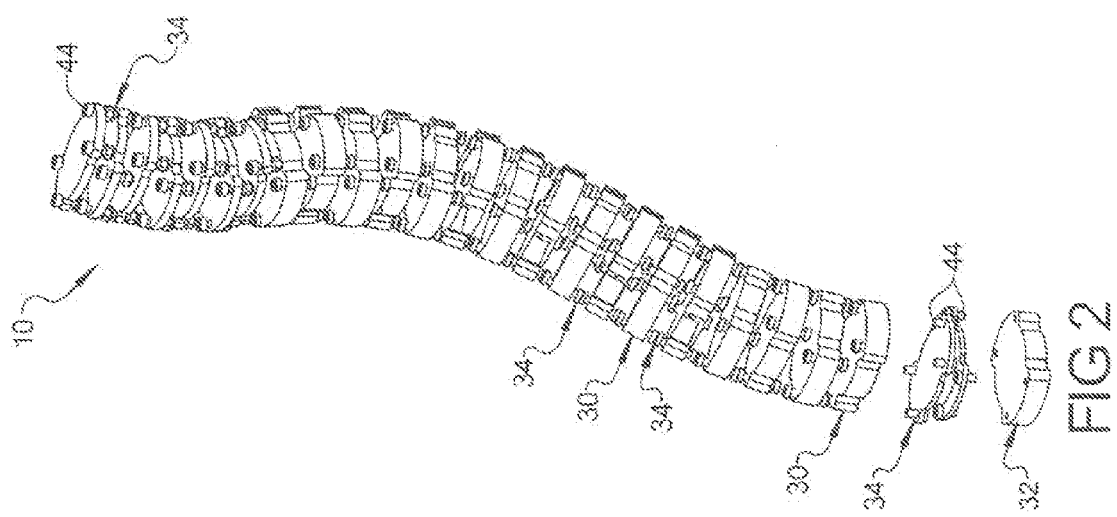
FIG. 2 is a perspective view of the flexible surrogate spine assembly of FIG. 1.
Figure 5:
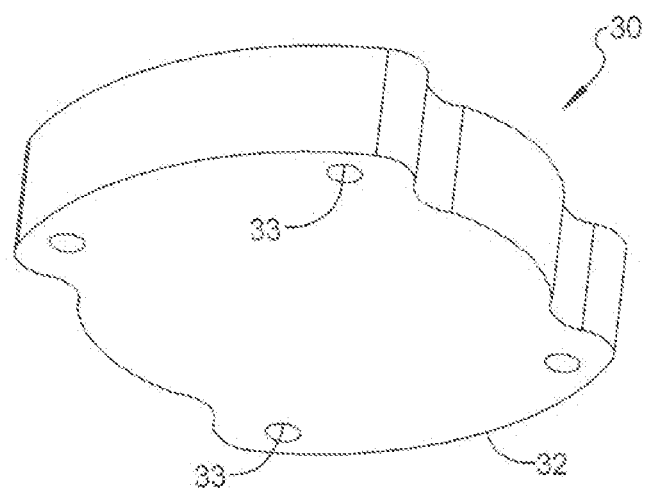
FIG. 5 is a perspective view of a vertebra disc of the flexible surrogate spine assembly of FIGS. 2 through 4.
Figure 6:
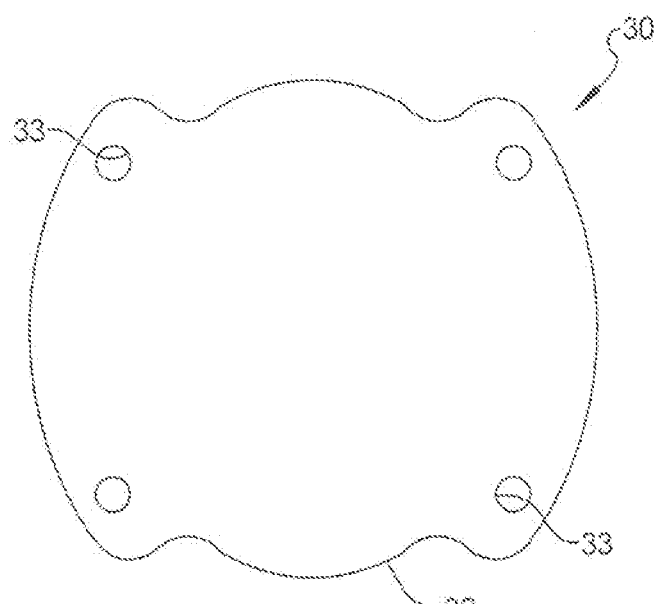
FIG. 6 is a front elevational view of a vertebra disc of the flexible surrogate spine assembly of FIGS. 2 through 4.
Figure 7:
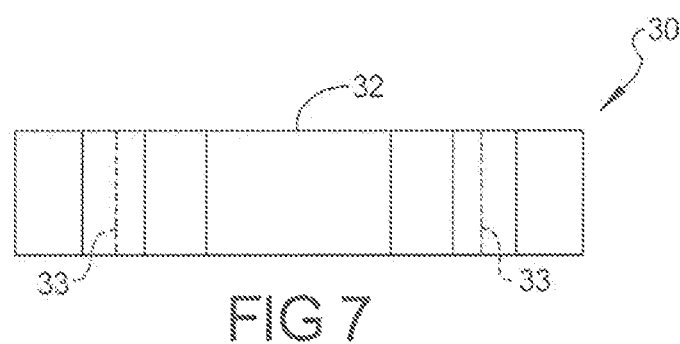
FIG. 7 is a side elevational view of a vertebra disc of the flexible surrogate spine assembly of FIGS. 2 through 4.

Referring to FIGS. 2 through 4, the flexible surrogate spine assembly 10 represents a human spine with the proper curvature. The spine assembly 10 has a plurality of modular vertebra segments, generally indicated at 30. In the embodiment illustrated, the spine assembly 10 has seven (7) cervical spine vertebra segments 30, twelve (12) thoracic spine vertebra segments 30, and five (5) lumbar spine vertebra segments 30. As illustrated in FIGS. 5 through 7, each vertebra segment 30 includes a vertebra disc 32 having a height or thickness corresponding to its location in either the cervical, thoracic, or lumbar area of the spine assembly 10. The vertebra disc 32 is made of a relatively rigid material such as metal or plastic. The vertebra disc 32 includes at least one, preferably a plurality of apertures 33 extending axially therethrough. It should be appreciated that the overall shape of the vertebra disc 32 will be different for the cervical, thoracic, or lumbar area of the spine assembly 10.

Figure 8:
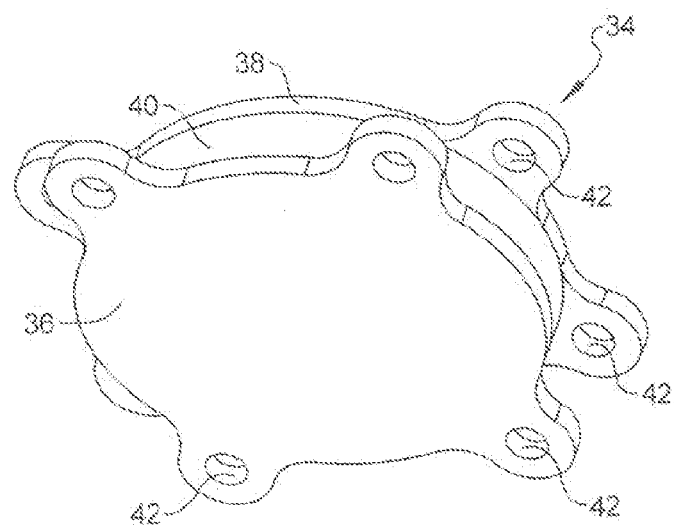
FIG. 8 is a perspective view of a ligament joint of the flexible surrogate spine assembly of FIGS. 2 through 4.
Figure 9:
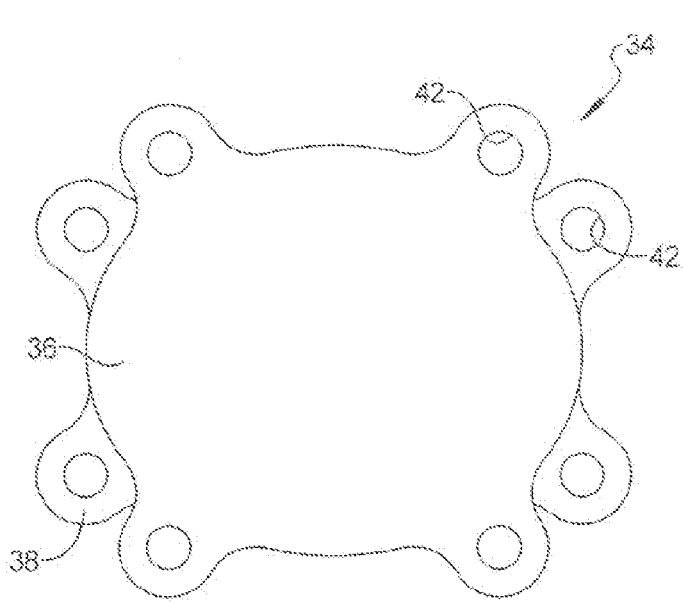
FIG. 9 is a front elevational view of a ligament joint of the flexible surrogate spine assembly of FIGS. 2 through 4.
Figure 10:
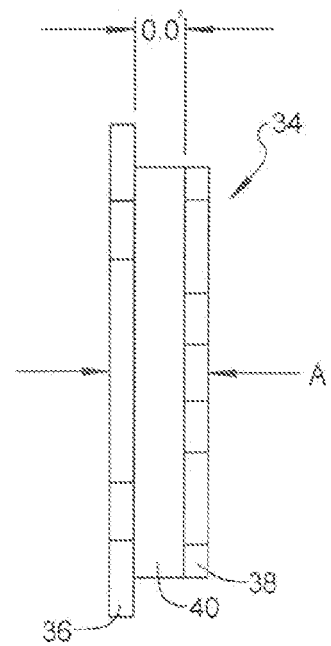
FIG. 10 is a side elevational view of a ligament joint of the flexible surrogate spine assembly of FIGS. 2 through 4.

Referring to FIGS. 2 through 4, each vertebra segment 30 includes a ligament joint, generally indicated at 34, disposed between adjacent vertebra discs 32. In the embodiment illustrated, one ligament joint 34 is disposed between a pair of vertebra discs 32. As illustrated in FIGS. 8 through 10, each ligament joint 34 has a first member such as an upper plate 36, a second member such as a lower plate 38, and a joint element 40 disposed between the upper plate 36 and lower plate 38. The upper plate 36 and lower plate 38 each have at least one, preferably a plurality of apertures 42 extending therethough for alignment with the apertures 33 of the vertebra discs 32. The upper plate 36 and lower plate 38 are made of a rigid material such as a metal material or a plastic material. The joint element 40 is made of a flexible material such as an elastomeric material, for example, rubber. The joint element 40 is connected to the upper plate 36 and lower plate 38 by a suitable mechanism such as an adhesive. It should be appreciated that each ligament joint 34 is integral and one-piece.

Figure 11A:
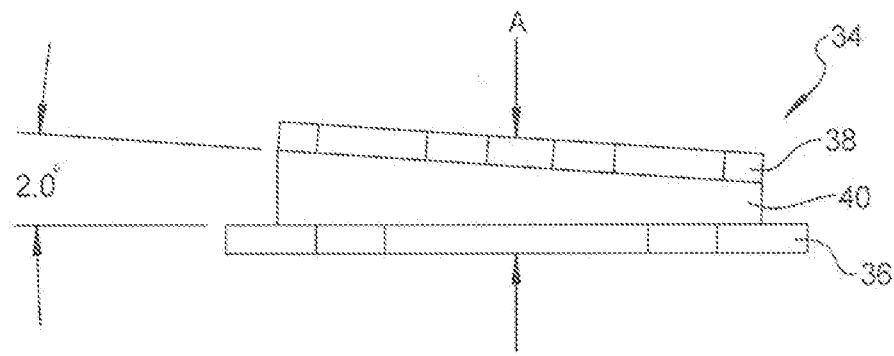
FIGS. 11A-11C are side elevational views of different ligament joints for the flexible surrogate spine assembly of FIGS. 2 through 4.
Figure 11B:
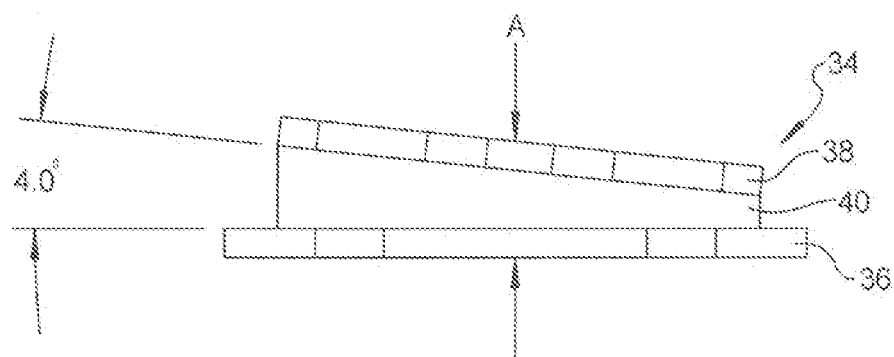
Figure 11C:
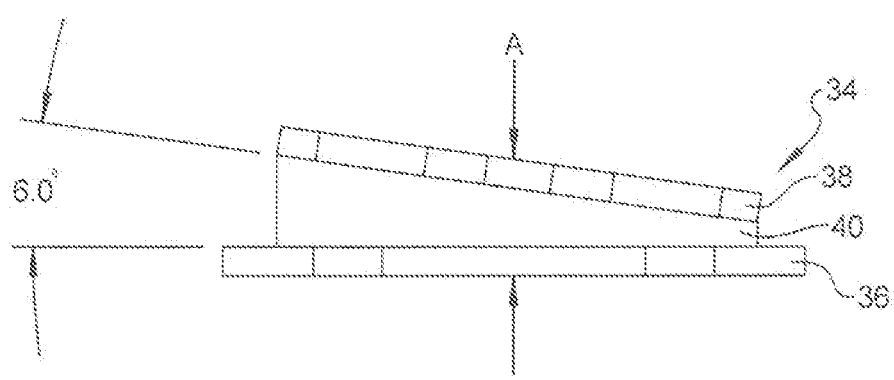

The joint element 40 has joint angles for different spine curvature. As illustrated in FIG. 10, the joint element 40 has its upper and lower surfaces perpendicular to a vertical neutral axis A to form a zero degree (0°) joint angle. Referring to FIGS. 11A through 11C, the joint element 40 is shown with different joint angles to allow different spine curvature. As illustrated in FIG. 11A, the joint element 40 has its upper and lower surfaces at an angle to the neutral axis to form a two degree (2°) joint angle. As illustrated in FIG. 11B, the joint element 40 has its upper and lower surfaces at an angle to the neutral axis to form a four degree (4°) joint angle. As illustrated in FIG. 11C, the joint element 40 has its upper and lower surfaces at an angle to the neutral axis to form a six degree (6°) joint angle. It should be appreciate that at least one of the upper and lower surfaces of the joint element 40 forms the predetermined angle. It should also be appreciated that both of the upper and lower surfaces of the joint element 40 may form the predetermined angle.

With a combination of the four different angled ligament joints 34, different spine curvatures can be created as follows:

| Condition | # of Vertebra Discs | Angle Range |
|---|---|---|
| Kyphosis (48-60°) | 12 | 0-72° |
| Neck Lordosis (24-46°) | 7 | 0-42° |
| Lumbar Lordosis (24-46°) | 5 (7 if use 2 from neck) | 0-30° (0-42°) |

It should be appreciated that the overall spine length remains constant regardless of the combinations of ligament joint angles. It should also be appreciated that each ligament joint 34 has a constant height or same length at the neutral axis A. It should further be appreciated that more joint angles could be created if necessary by varying the angle of the upper and lower surfaces of the joint element 40 that allows the spine assembly to have different curvatures to present different human standing or sitting postures. It should still further be appreciated that the joint angles of the joint elements 40 allow for the spine assembly 10 to have an adjustable curvature.

As illustrated in FIGS. 2 through 4, the flexible surrogate spine assembly 10 includes at least one, preferably a plurality of fasteners 44 to fasten the vertebra segments 30 together. The fasteners 44 are bolts to fasten the ligament joints 34 and the vertebra discs 32 together. As illustrated, the fasteners 44 are threaded and extend through the apertures 42 in the upper plate 36 to threadably engage the apertures 33 in the upper adjacent vertebra disc 32 and extend through the apertures 42 in the lower plate 38 to threadably engage the apertures 33 in the lower adjacent vertebra disc 32. It should be appreciated that the fasteners 44 may be of any suitable type for allowing the ligament joints 34 and vertebra discs 32 to be fastened together.

Figure 12:
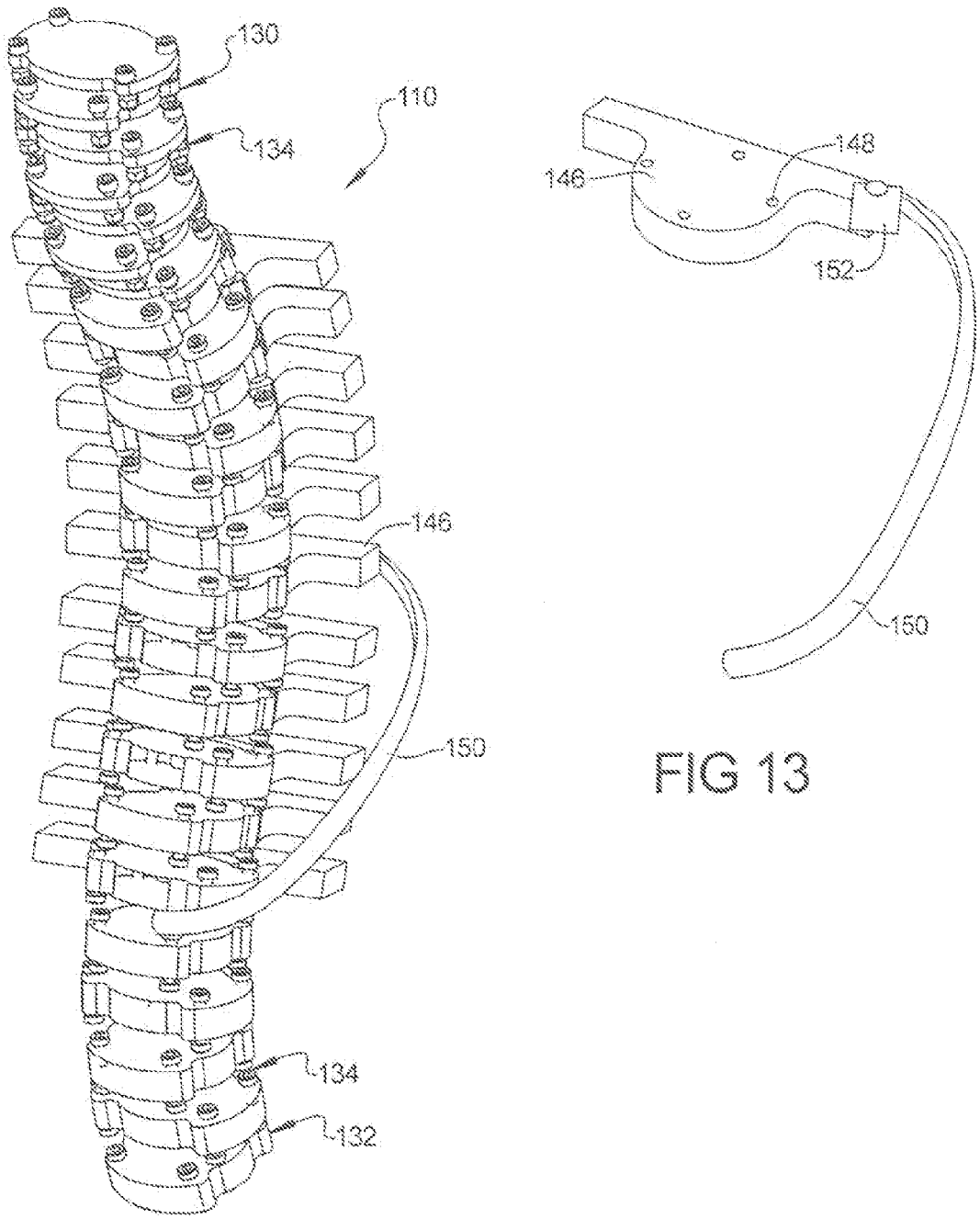
FIG. 12 is a perspective view of another embodiment, according to the present invention, of the flexible surrogate spine assembly of FIG. 1.
Figure 13:
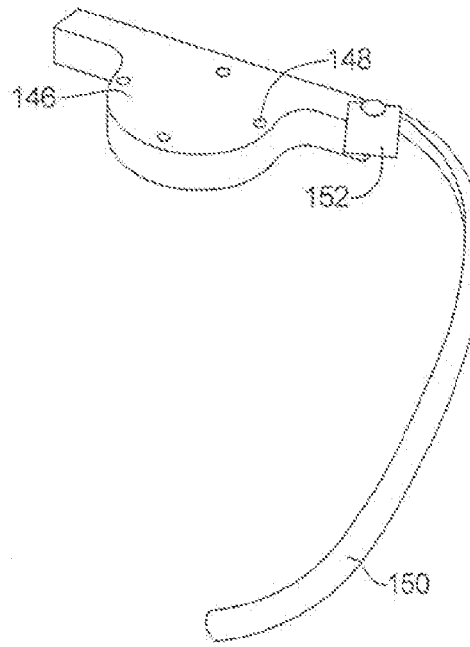
FIG. 13 is a perspective view of a vertebra disc constructed as a load cell for the flexible surrogate spine assembly of FIG. 12.

Referring to FIGS. 12 and 13, another embodiment, according to the present invention, of the flexible surrogate spine assembly 10 is shown. In this embodiment, like parts of the flexible surrogate spine assembly 10 have like reference numerals increased by one hundred (100). Due to the modular vertebra segments 130, the spine assembly 110 can have each vertebra disc 132 for a vertebra segment 130 replaced with a transducer to measure forces and moments that are transferred between the vertebra discs 132. As illustrated in FIG. 13, the transducer may be a spine load cell 146 constructed as a vertebra disc. The transducer may also include a rib load cell 148 that operates with a flexible joint for a rib cage member to be described. It should be appreciated that the spine load cell 146 and rib load cell 148 may be either two separated load cells or combined as one load cell.

Referring to FIGS. 1, 12, and 13, the rib cage assembly 16 includes a plurality of rib cage members 150 connected to the spine assembly 110. The rib cage member 150 has a general "C" shape. The rib cage member 150 may have an oval or rectangular cross-section with round corners. The rib cage member 150 is made of a plastic material such as a thermoplastic material such as polyethylene or a thermoset plastic material such as a blend of two or all of the prepolymers Adiprene® LF 750 D, Adiprene® LF 650 D, and Adiprene® LF 950 A, which are commercially available from Chemtura Corporation. It should be appreciated that the blend is cured with commercially available MOCA curative. It should also be appreciated that the blend is adjusted to achieve the specific static and dynamic properties required for a particular application.

The rib cage assembly 16 also includes a flexible element 152 between the rib load cell 148 and the rib cage member 150. The rib cage member 150 has a rear portion connected to the flexible element 152 by a suitable mechanism such as an adhesive. The rib cage assembly 16 also includes a cartilage simulator (not shown) between the rib cage member 150 and sternum (not shown). It should be appreciated that the spine assembly 110 allows an interface with the rib cage assembly 16 and offers the capability to accommodate a load cell to measure the load transferred from each individual rib cage member 150 to the spine assembly 10.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A flexible surrogate spine assembly for a crash test dummy comprising:
   at least five vertebra discs;
   a plurality of ligament joints disposed between said at least five vertebra discs; and
   said ligament joints having a joint element with varying joint angles such that four different joint angles can replicate Kyphosis and Lordosis angles of a human spine, wherein each said joint element has an upper surface extending in a plane and a lower surface extending in a plane, at least one of said upper surface and said lower surface forming a predetermined angle relative to an axis perpendicular to a vertical neutral axis of said ligament joint, and wherein each said ligament joint comprises an upper member having a planar lower surface, a lower member having a planar upper surface, and said joint element being disposed between said lower surface of said upper member and said upper surface of said lower member.

2. A flexible surrogate spine assembly as set forth in claim 1 wherein said predetermined angle ranges from zero degrees (0°) to six degrees (6).

3. A flexible surrogate spine assembly as set forth in claim 1 wherein said upper member and said lower member are made of a rigid material.

4. A flexible surrogate spine assembly for a crash test dummy comprising:
   at least five vertebra discs;
   a plurality of ligament joints disposed between said at least five vertebra discs;
   said ligament joints having a joint element with varying joint angles such that four different joint angles can replicate Kyphosis and Lordosis angles of a human spine, wherein said joint element has an upper surface extending in a plane and a lower surface extending in a plane, at least one of said upper surface and said lower surface forming a predetermined angle relative to an axis perpendicular to a vertical neutral axis of said ligament joint; and
   wherein at least one of said at least five vertebra discs is a transducer to measure forces and moments that are transferred between said vertebra discs.

5. A flexible surrogate spine assembly as set forth in claim 4 wherein said transducer is a spine load cell constructed as a vertebra disc.

6. A flexible surrogate spine assembly as set forth in claim 5 wherein said transducer includes a rib load cell constructed as part of a vertebra disc.

7. A flexible surrogate spine assembly as set forth in claim 6 wherein said spine load cell and rib load cell are either combined or separate load cells.

8. A flexible surrogate spine assembly for a crash test dummy comprising:
- a plurality of vertebra discs;
- a plurality of ligament joints disposed between said vertebra discs;
- said ligament joints having a joint element with varying joint angles that can replicate Kyphosis and Lordosis angles of a human spine, wherein each said joint element has an upper surface extending in a plane and a lower surface extending in a plane, at least one of said upper surface and said lower surface forming a predetermined angle relative to an axis perpendicular to a vertical neutral axis of said ligament joint;
- each said ligament joint comprising an upper plate, a lower plate, and a joint element disposed between said upper plate and said lower plate; and
- wherein said joint element is made of a flexible material.

9. A crash test dummy comprising:
- a body;
- a flexible surrogate spine assembly connected to said body; and
- said flexible surrogate spine assembly comprising at least four vertebra segments with varying joint angles such that four different joint angles can replicate Kyphosis and Lordosis angles of a human spine, wherein each of said at least four vertebra segments comprise a vertebra disc and a ligament joint, each said ligament joint having a joint element with an upper surface extending in a plane and a lower surface extending in a plane, at least one of said upper surface and said lower surface forming a predetermined angle relative to an axis perpendicular to a vertical neutral axis of said ligament joint, and wherein each said ligament joint comprises an upper member having a planar lower surface, a lower member having a planar upper surface, and said joint element being disposed between said lower surface of said upper member and said upper surface of said lower member.

10. A crash test dummy comprising:
- a body;
- a flexible surrogate spine assembly connected to said body;
- said flexible surrogate spine assembly comprising at least four vertebra segments with varying joint angles such that four different joint angles can replicate Kyphosis and Lordosis angles of a human spine, wherein each of said at least four vertebra segments comprise a vertebra disc and a ligament joint, each said ligament joint having an upper surface extending in a plane and a lower surface extending in a plane, at least one of said upper surface and said lower surface forming a predetermined angle relative to an axis perpendicular to a vertical neutral axis of said ligament joint; and
- wherein each said ligament joint comprises an upper plate, a lower plate, and a joint element disposed between said upper plate and said lower plate.

11. A crash test dummy as set forth in claim 10 wherein said predetermined angle ranges from zero degrees (0°) to six degrees (6).

12. A crash test dummy as set forth in claim 10 wherein at least one of said at least four vertebra discs is a transducer to measure forces and moments that are transferred therebetween.

13. A crash test dummy as set forth in claim 10 including a rib cage assembly connected to said spine assembly.

14. A crash test dummy as set forth in claim 13 wherein said rib cage assembly includes a plurality of rib cage members connected to at least two of said at least four vertebra segments.

15. A crash test dummy as set forth in claim 14 wherein said rib cage assembly includes a flexible element disposed between said at least two of said at least four vertebra segments and said rib cage members.

16. A crash test dummy comprising:
- a body;
- a flexible surrogate spine assembly connected to said body;
- a rib cage assembly connected to said spine assembly;
- said flexible surrogate spine assembly comprising a plurality of vertebra segments, each of said vertebra segments comprising a vertebra disc and a ligament joint with varying joint angles that can replicate Kyphosis and Lordosis angles of a human spine, each said ligament joint comprising an upper plate, a lower plate, and a joint element disposed between said upper plate and said plate, each said joint element having an upper surface extending in a plane and a lower surface extending in a plane, at least one of said upper surface and said lower surface forming a predetermined angle ranging from zero degrees (0) to six degrees (6) relative to an axis perpendicular to a vertical neutral axis of said ligament joint; and
- said rib cage assembly comprising a plurality of rib cage members connected to said vertebra segments.

* * * * *